(12) United States Patent
Portuallo et al.

(10) Patent No.: US 10,717,393 B2
(45) Date of Patent: Jul. 21, 2020

(54) VEHICLE DISPLAY ASSEMBLAGE

(71) Applicant: ARTA HOLDINGS LLC, Coral Springs, FL (US)

(72) Inventors: Thomas Portuallo, Parkland, FL (US); Ariel Gonzalez, Miami, FL (US)

(73) Assignee: ARTA Holdings LLC

( * ) Notice: Subject to any disclaimer, the term of this patent is extended or adjusted under 35 U.S.C. 154(b) by 0 days.

(21) Appl. No.: 16/010,423

(22) Filed: Jun. 16, 2018

(65) Prior Publication Data
US 2019/0381948 A1  Dec. 19, 2019

(51) Int. Cl.
| | | |
|---|---|---|
| *B60R 11/00* | (2006.01) | |
| *B60R 13/04* | (2006.01) | |
| *B60Q 1/32* | (2006.01) | |
| *B60Q 1/26* | (2006.01) | |
| *F16B 2/06* | (2006.01) | |

(52) U.S. Cl.
CPC ............ *B60R 11/00* (2013.01); *B60Q 1/2615* (2013.01); *B60Q 1/2696* (2013.01); *B60Q 1/32* (2013.01); *B60R 13/04* (2013.01); *F16B 2/065* (2013.01); *B60R 2011/004* (2013.01)

(58) Field of Classification Search
CPC ... B60R 11/00; B60R 13/04; B60R 2011/004; B60R 1/12; B60R 13/005; B60Q 1/2615; B60Q 1/2696; B60Q 1/32; F16B 2/065; B25B 5/067; B25B 5/101; G09F 21/04; G09F 21/048
See application file for complete search history.

(56) References Cited

U.S. PATENT DOCUMENTS

| | | | | |
|---|---|---|---|---|
| 1,179,100 A | * | 4/1916 | Hayes | F16M 13/02 248/231.41 |
| 5,037,051 A | * | 8/1991 | Moriello | B60R 1/12 211/113 |
| 5,802,660 A | * | 9/1998 | Appleby | B60R 1/0602 15/210.1 |
| 6,467,918 B2 | * | 10/2002 | Strode | B60R 1/12 359/871 |
| 6,811,269 B2 | * | 11/2004 | Strode | B60R 1/12 359/838 |
| 8,464,398 B2 | * | 6/2013 | Parker | B60R 1/12 16/422 |
| 9,205,779 B1 | * | 12/2015 | Liu | B60R 1/078 |
| 9,421,912 B1 | * | 8/2016 | Hu | B60R 1/078 |
| 2007/0019312 A1 | * | 1/2007 | Hu | B60R 1/078 359/871 |
| 2015/0183374 A1 | * | 7/2015 | Liu | B60R 1/078 359/865 |
| 2018/0118110 A1 | * | 5/2018 | Frampton | B60R 1/12 |

* cited by examiner

*Primary Examiner* — Christopher Garft
(74) *Attorney, Agent, or Firm* — Tucker Law; Matthew Sean Tucker, Esq.

(57) ABSTRACT

A vehicle display assemblage that includes a base portion and a clamp portion, the base portion has an upper clamp portion with a downward facing clamp surface and the clamp portion includes an upward facing clamp surface, a means of drawing the downward and upward facing clamp surfaces together for a clamping relation about a sideview mirror of a vehicle, and display indicia secured with the vehicle display assemblage.

9 Claims, 6 Drawing Sheets

VEHICLE DISPLAY ASSEMBLAGE

FIELD OF THE INVENTION

The present invention relates to a display assemblage, and more particularly to a vehicle display assemblage mountable about a side view mirror of a vehicle.

BACKGROUND OF THE INVENTION

For many years, vehicle personalization has continued to steadily increase. Exterior novelty vehicle accessories, such as vehicle flag systems that mount to the upper edge of a vehicle window are common. The novelty vehicle accessories used to express individuality of one's vehicle is no more pronounced than vehicle flags. From American and military flags to one's favorite sports team, many options exist to personalize existing vehicles on the road by hanging a flag out of a window.

However, a number of shortcomings exist for existing novelty vehicle accessories, particularly including vehicle window flags. For example, one major shortcoming to existing vehicle flags is that when a person accidentally rolls down the window, the flag is commonly ripped from the window due to wind. Thus, the novelty vehicle accessory of a window flag provides personalization but in turn prevents full function of the vehicle.

In another shortcoming, vehicle window flags are limited to displaying only from a vehicle window. For example, U.S. Pat. No. 5,463,974 discloses that prior flag mounts work effectively when stationary but tend to fall off while the vehicle is in transit due to the torsional and bending movements generated by wind forces.

There is a need in the art for a vehicle display assemblage capable of securing about the side view mirrors of a vehicle.

SUMMARY OF THE INVENTION

The present invention advantageously provides a novelty side view mirror display assembly comprising a clamping bracket that has a base portion, a first clamp surface that extends from an upper edge of the base portion, the first clamp surface formed for contacting an outer rearview mirror surface, the clamping bracket further including at least one display aperture, a clamp member having a central body, a second clamp surface extending substantially perpendicular out from the central body along a first central body edge, and a bottom portion extending substantially perpendicular out from the central body along a second central body edge, the bottom portion includes at least one tension member configured for drawing the second clamp surface towards the first clamp surface and at least one indicia members securable about the at least one display aperture.

According to an embodiment of the present invention, a principal object is to further provide at least two display apertures and at least two indicia members secured with the at least two display apertures.

According to an embodiment of the present invention, another object is to provide one or more indicia members that secure and release with one or more display apertures.

According to yet another embodiment of the present invention, another object is to provide a novelty side view mirror display assembly that is constructed and arranged to clamp against the edge of a side view mirror of a vehicle.

According to another embodiment of the present invention, another object is to provide a novelty side view mirror where at least one indicia member is a jewel.

According to yet another embodiment of the present invention, another object is to provide a novelty side view mirror display assembly where at least one indicia member includes an LED that illuminates during vehicle motion.

According to an embodiment of the present invention, another object is to provide a novelty side view mirror display assembly where the first clamp surface and the second clamp surface are affixed with a scratch layer provided for contacting the side view mirror thereby preventing the first and second clamp surfaces from scratching paint when in contact with the side view mirror.

Yet another object is to provide a novelty side view mirror display assembly where the at least one tension members are screws.

According to an embodiment of the present invention, another object is to provide a novelty side view mirror display assembly where rotating the tension members clockwise causes the distal tip to push against a rear surface of the base portion thereby drawing the second clamp surface towards the first clamp surface.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
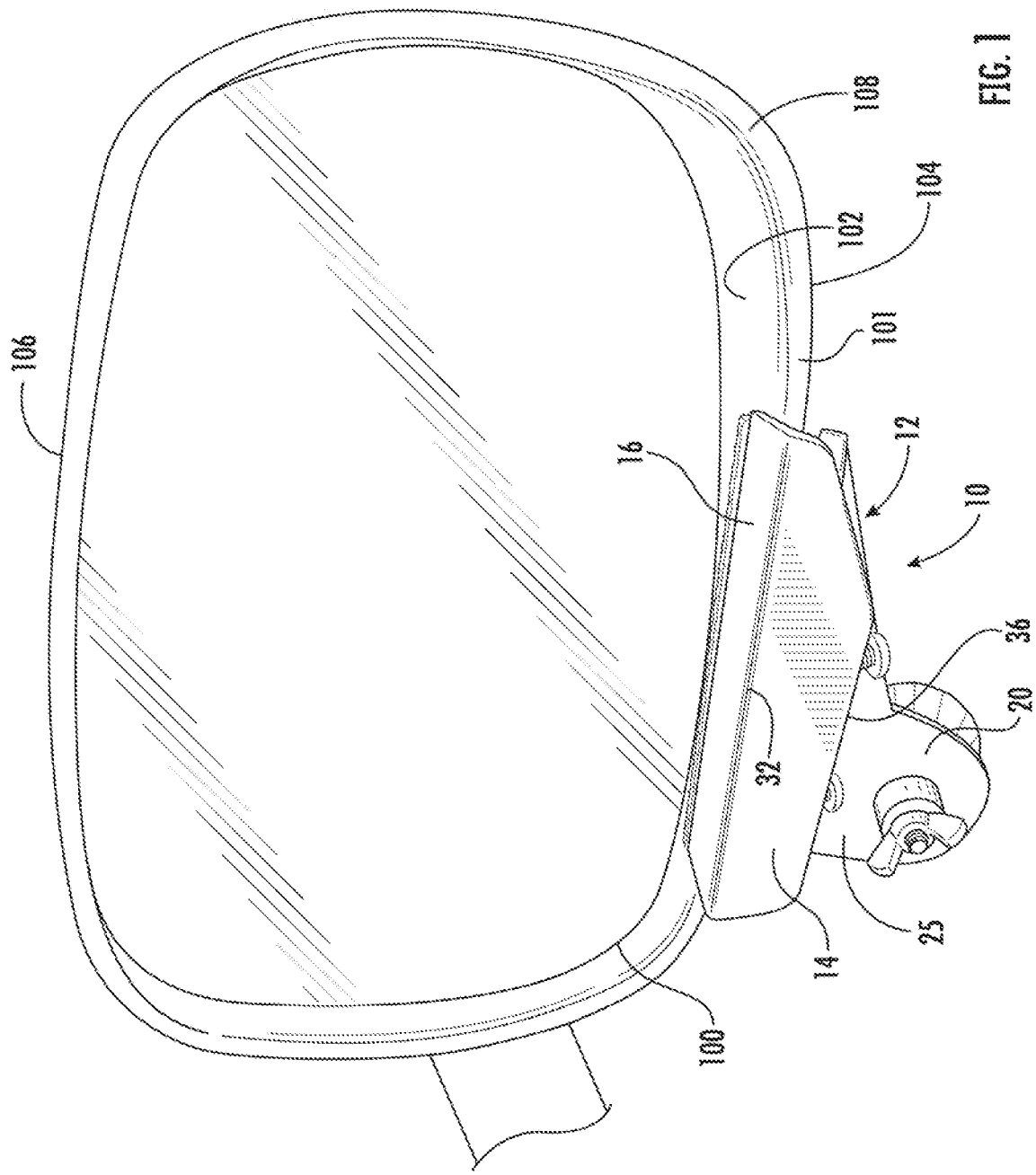
FIG. 1 is a perspective view of a vehicle display assemblage mountable about a side view mirror of a vehicle in accordance with the features of one embodiment of the present invention.

The present invention advantageously provides a vehicle display assemblage. Accordingly, the vehicle display assemblage components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawings figures in which like reference designators refer to like elements. FIG. 1 shows an exemplary vehicle display assemblage constructed in accordance with the principles of the present invention and designated generally as vehicle display assemblage 10.

In particular, vehicle display assemblage 10 comprises a clamping bracket 12. The clamping bracket 12 is constructed and arranged to secure with a side view mirror 100 of a vehicle.

The clamping bracket 12 includes a base portion 14. In one non-limiting embodiment, the base portion 14 is formed in a u-shape.

Figure 2:
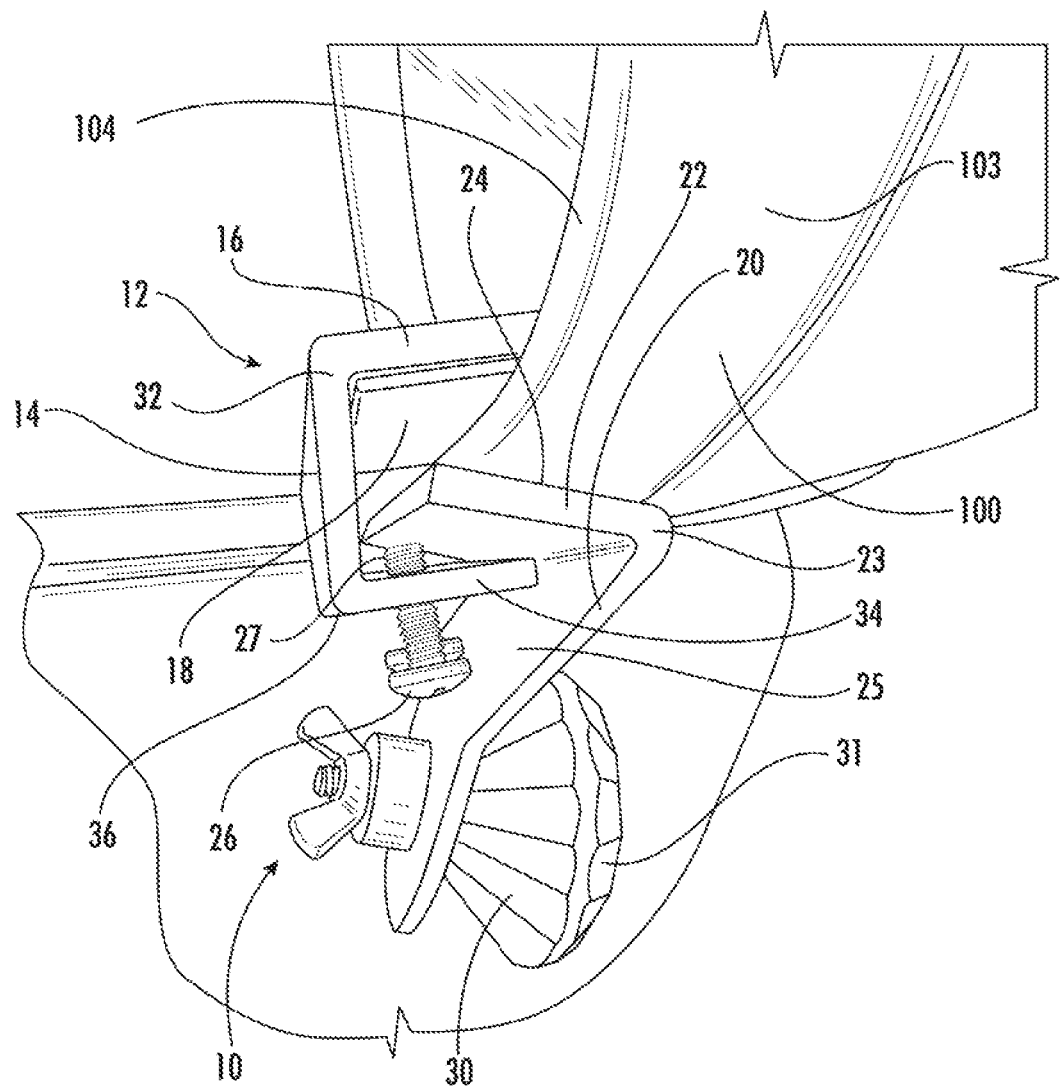
FIG. 2 is a side perspective view of the vehicle display assemblage in accordance with the principles of the present embodiment.

Referring now to FIGS. 1 and 2, the base portion 14 is provided having an upper clamp portion 16 that extends outward from a first edge 32 of the u-shaped base portion 14, the upper clamp portion 16 includes a downward facing clamp surface 18. The downward facing clamp surface 18 is constructed to affix against the inner surface 102 of the side view mirror 100. The u-shaped base portion 14 is further provided having a lower base 34 that extends outward from a second edge 36 of the u-shaped base portion 14.

Figure 3:
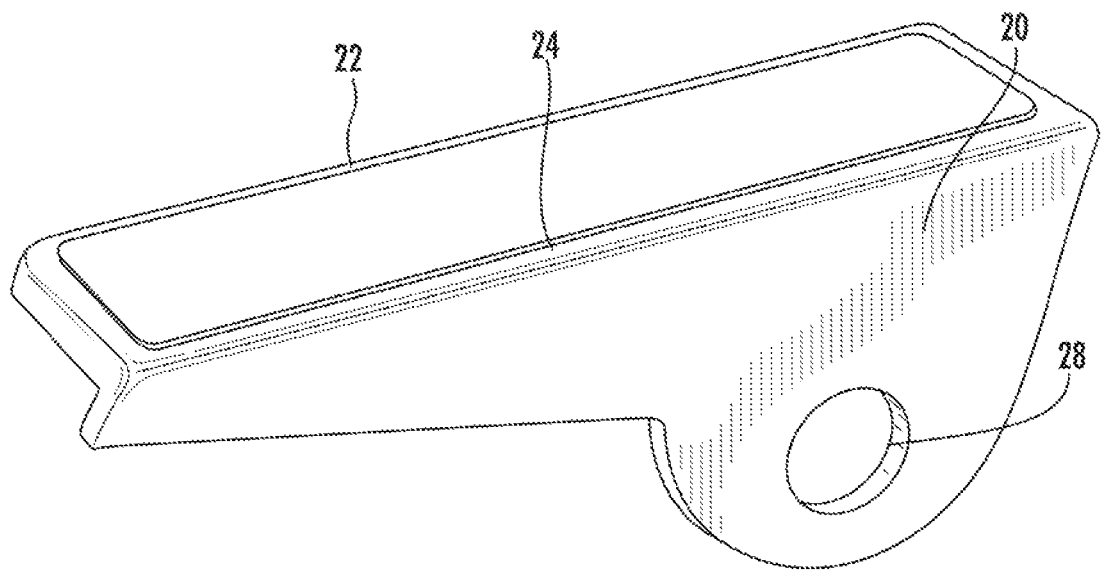
FIG. 3 is a perspective view of a clamp member of a vehicle display assemblage in isolation in accordance with the principles of the present embodiment.

Still referring to FIGS. 1 and 2, the clamping bracket 12 further includes a clamp member 20. The clamp member 20 is provided having a lower clamp portion 22 (FIGS. 2 and 3) that extends out from an edge 23 of a clamp base 25, the lower clamping portion 22 has an upward facing clamp surface 24 (FIG. 3). The upward facing clamp surface 24 is constructed to affix against the outer surface 103 of the side view mirror 100.

As illustrated in FIG. 2, the downward facing clamp surface 18 and the upward facing clamp surface 24 are positionable with opposing surfaces for sandwiching about a portion of the side view mirror 100.

Referring to FIG. 3, the clamping bracket 12 further includes one or more novelty display apertures 28 that extent outward from the clamping bracket 12. The one or more novelty display apertures 28 are constructed to accept one or more display members 30 (FIGS. 1 and 2). The one or more display members 30 (FIGS. 1 and 2) secure with the clamping bracket 12 about one or more apertures 28 for displaying substantially from the side view mirror 100 (FIG. 1).

Figure 4:
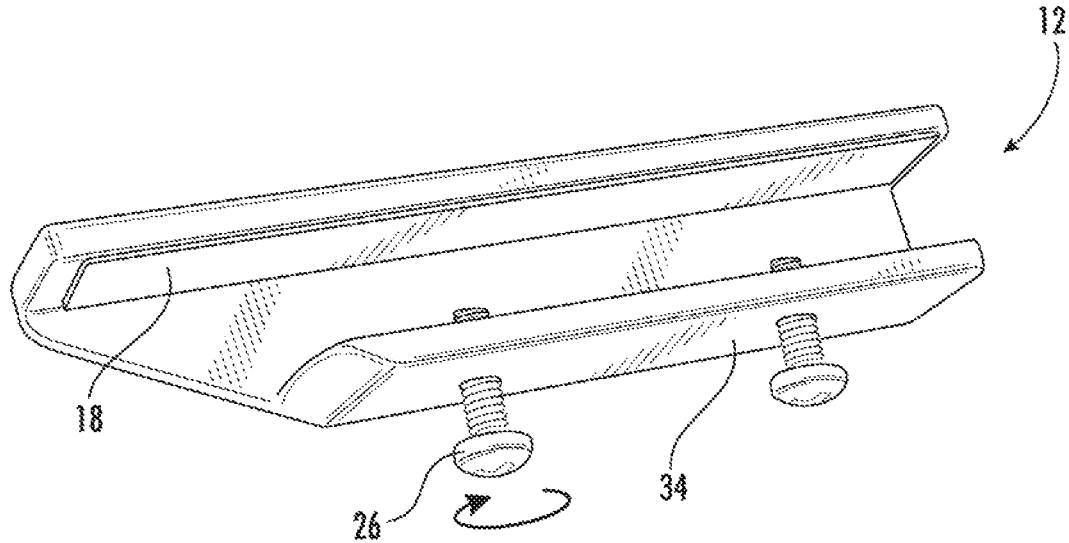
FIG. 4 is a rear perspective view of a clamping bracket of a vehicle display assemblage in isolation in accordance with the principles of the present embodiment.

Referring now to FIG. 4, the clamping bracket 12 includes tightening members 26. The tightening members 26 shown in FIGS. 2 and 4 engage with the lower base 34. The tightening members 26 are rotatably provided for urging the upward facing clamp surface (FIGS. 2 and 3) towards the downward facing clamp surface 18 (FIGS. 2 and 4) about distal end 27 (FIG. 2) of the tightening members 26.

In one non-limiting embodiment, the tightening members 26 are rotated about a threaded bore to exert a vertical force on the clamp member 20 to force the upward facing clamp surface 24 towards the downward facing clamp surface 18.

In one non-limiting embodiment, exemplified by the combination of FIGS. 1-4, the tightening members 26 are screws that are rotated in one direction thereby applying a force on the the clamp member 20 which moves the clamp member 20 towards at least a portion of the base portion 14. In operation, the tightening of the tightening members 26 causes the downward facing clamp surface 18 and the upward facing clamp surface 24 to grip against the inner and outer surface 102 and 103 of the sideview mirror. The instant invention contemplates that the vehicle display assemblage 10 may be positioned along any portion of the sideview mirror edge 101, such that the vehicle display assemblage 10 is positioned along the bottom edge 104 of the side view mirror, as shown in FIGS. 1 and 2, or along the top edge 106 of the side view mirror, or anywhere in between.

In another non-limiting embodiment, the shape of the clamping bracket may be modified to allow the vehicle display assemblage 10 to be mounted about a substantially turning surface edge 108 (FIG. 1) of the side view mirror 100. In operation, this allows the display members 30 to be displayed about the side view mirror 100 at a combination of a vertical and/or horizontal distance out from the side view mirror. For example, FIGS. 1 and 2 exemplifies a display member 30 extending out below a side view mirror.

The downward facing clamp surface 18 and the upward facing clap surface 24 are in a clamping relation.

While the instant embodiment has depicted a novelty jewel 31 (FIG. 2), the one or more display members 30 may include any conceivable personalized novelty indicia. For example, a fisherman may optionally attach a fish hook or a fish lure. For another example, the display members 30 may include a personalized flag, such as a professional sports team.

For yet another example, the one or more display members 30 may include LED lights that illuminate. The LED lights may illuminate based on motion of the vehicle, such that the LED lights illuminate as the vehicle travels on roads. The LED lights may be powered via a battery and/or solar power. For example, if the one or more display members 30 are a gem (as illustrated), the gem itself will illuminate.

Figure 5:
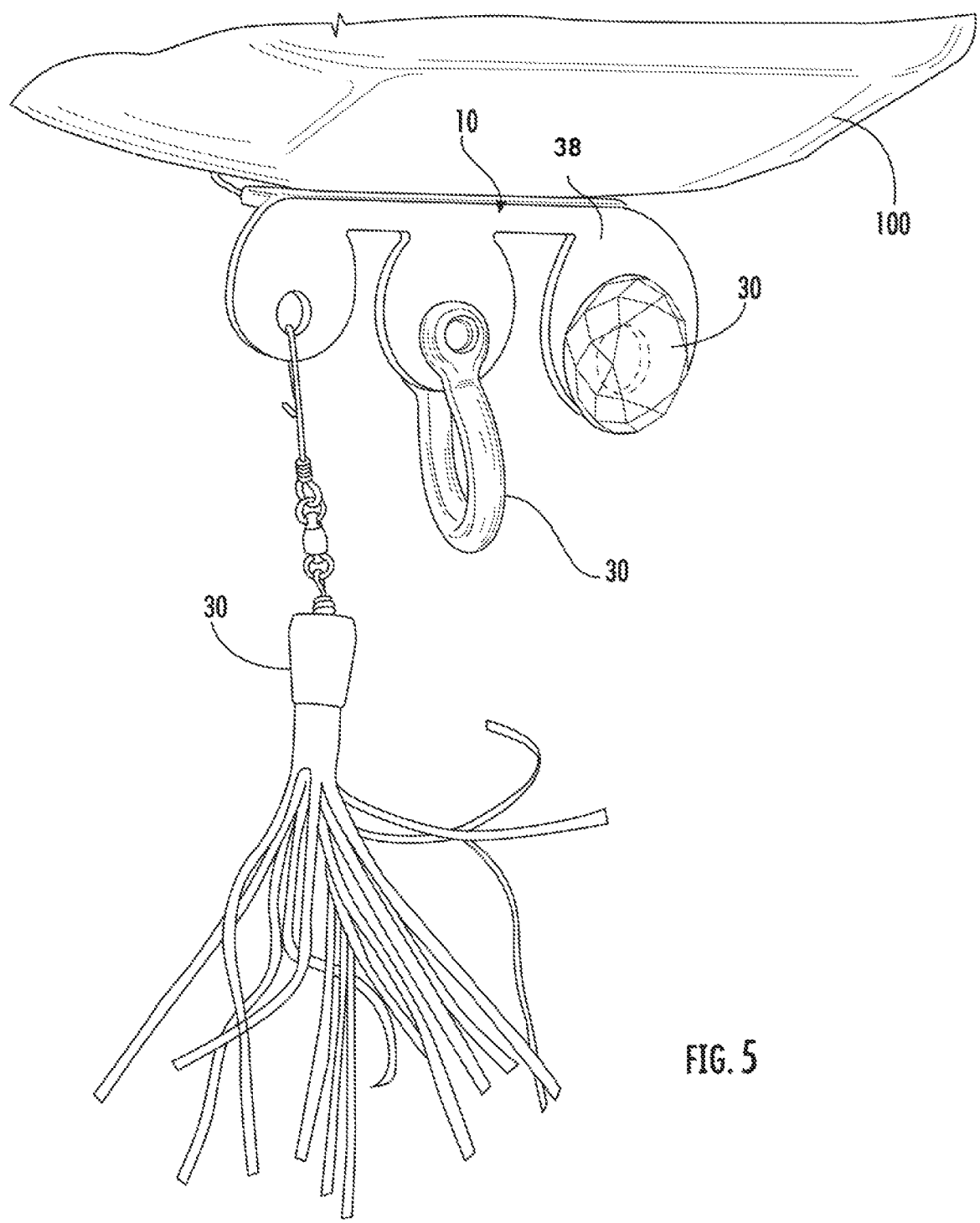
FIG. 5 is a front perspective view of an alternative embodiment of a vehicle display assemblage in accordance with the principles of the present embodiment.

FIG. 5 provides a front perspective view of the vehicle display assemblage 10 secured with a vehicle mirror 100 with a forward facing display member 30 in relation to the vehicle sideview mirror 100. While the instant embodiment depicts multiple forward facing display member 30, display members may be alternatively displayed in additional orientations and directions, including to the side and behind as viewed relative to the vehicle sideview mirror 100. The instant embodiment provides exemplary display members 30, including a gem, jewelry, and a fishing lure.

Figure 6:
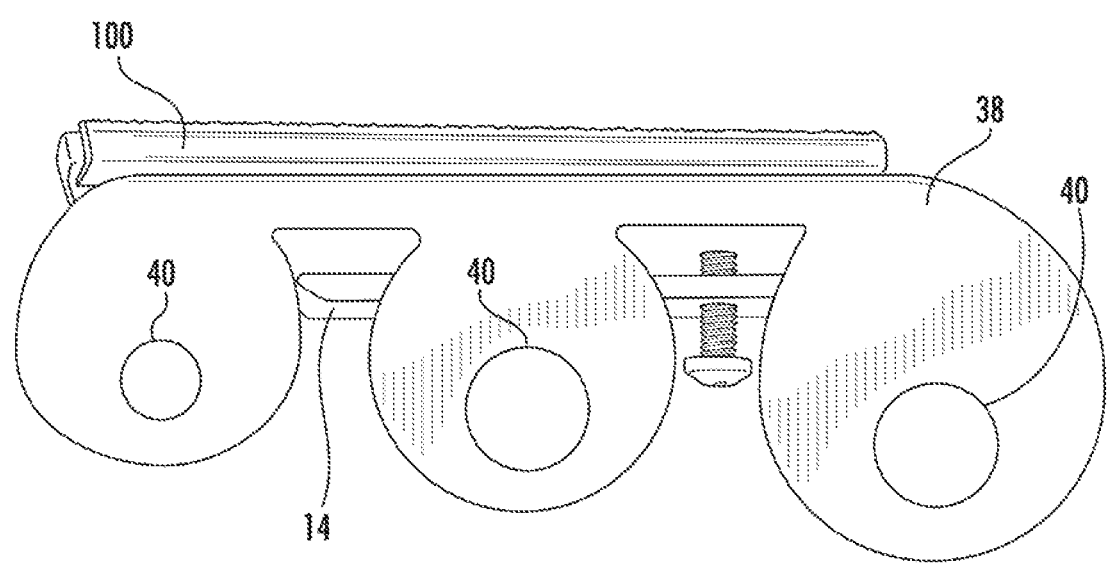
FIG. 6 is a front view of an alternative embodiment of the vehicle display assemblage in accordance with the principles of the present embodiment.

FIGS. 5 and 6 provide an alternative embodiment of clamp member 38 for securing with a side view mirror 100. An alternative example of the clamp member 38 is provided with multiple novelty display apertures 40 are constructed to accept multiple display members 30. The multiple display members 30 secure with the clamping bracket 12 for displaying multiple display members 30 substantially from the side view mirror 100. The clamp member 38 mates with the base portion 14, within the spirit and scope of the invention described herein.

Figure 7:
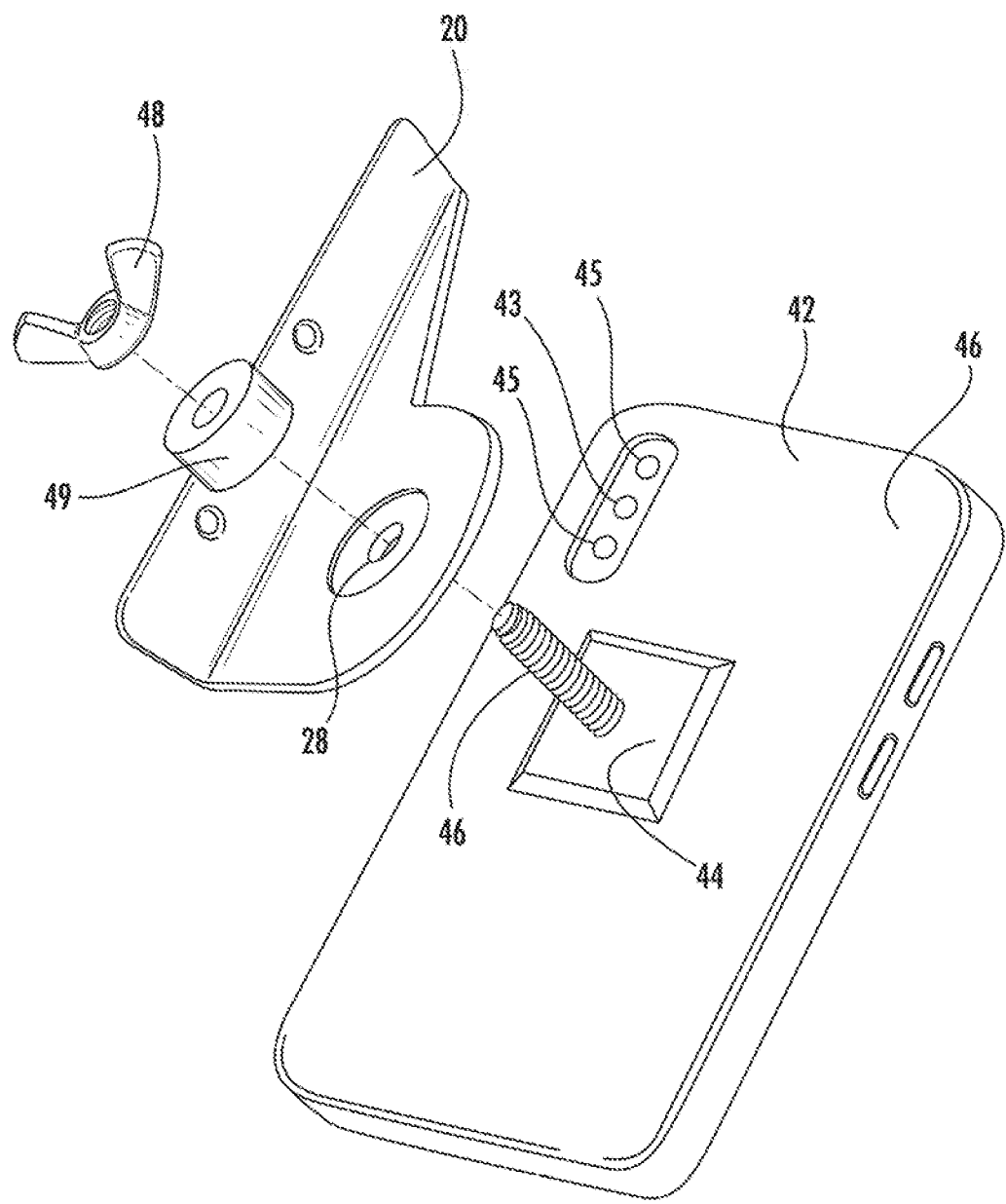
FIG. 7 is a side perspective view of an alternative embodiment of the vehicle display assemblage that includes a camera bracket in accordance with the principles of the present embodiment.

FIG. 7 provides a particular embodiment of a camera bracket 42 constructed and arranged to removably affix with the clamp member 20. The camera bracket includes a raised portion 44 situated on the rear body 46 of the camera bracket 42. The camera bracket 42 further includes a stem 46. The stem 46 is constructed to pass through the aperture 28 and secure with the clamp member 20. The stem 46 may optionally be threaded and secure with the clamp member 20 via a fastener 48, such as the wing nut, and washer 49, pictured in FIG. 7.

In one embodiment, the camera bracket 42 shown in FIG. 7 is shaped to retain a smart phone that has at least one camera 45. In a certain embodiment, the camera bracket 42 is a unitary plastic member.

Still referring to FIG. 7, the camera maintained by the camera bracket 42 may take pictures and/or video. In addition, the camera 43 maintained by the camera bracket 42 may take any combination of forward looking, side looking, and rear looking pictures and video. The camera subject may be illuminated by one or more lights 45.

While the instant invention provides a clamping mechanism that includes tightening members 26, namely screws, disposed about the u-shaped base portion that exert a force at a distal portion 27 of the tightening members 26 on the clamp member 20, the instant invention is not limited to screws. It is within the spirit and scope of the invention to include any means of securing the vehicle display assemblage with the side view mirror of a vehicle. Such means of securing the vehicle display assemblage with the side view mirror of the vehicle includes a suction member provided about the vehicle display assemblage for affixing with the side view mirror 100 via suction. In yet another alternative means of securing the vehicle display assemblage with the side view mirror of the vehicle includes a clamp with a mechanical lever for clamping with side view mirror 100.

While the instant invention provides a base portion 14 and a clamp member 20 that may be disjoined when not clamped with a vehicle side view mirror 100, it is within the spirit and scope of the instant invention to provide a base portion 14 and a clamp member 20 that are permanently coupled to one another.

As used herein, when the term "and/or" is used, it shall include all combinations of one or more of the associated described items.

As used herein, spatially relative terms may be intended to encompass the orientation of the different orientations of the system or device as it relates to the orientations depicted in the Figures. Such terms may include "inner", "outer", "above", "upper", "beneath", "below", "lower", and the like.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure.

What is claimed is:

1. A novelty side view mirror display assembly comprising:

a clamping bracket having a base portion and a clamp member, a first clamp surface extending from an upper edge of the base portion, the first clamp surface formed for contacting a side view mirror surface, the clamping bracket further including at least one display aperture, the clamp member having a clamp body, a second clamp surface extending substantially perpendicular out from the clamp body along a first clamp body edge, and a bottom portion extending substantially perpendicular out from the base portion along a second clamp body edge, the bottom portion includes at least one tension member configured for drawing the second clamp surface towards the first clamp surface; and at least one indicia member securable about the at least one display aperture.

2. The novelty side view mirror display assembly of claim 1, further comprising the at least one display aperture comprises at least two display apertures and at least two indicia members secured with the at least two display apertures.

3. The novelty side view mirror display assembly of claim 1, wherein the at least one indicia members releasably secures with the at least one display aperture.

4. The novelty side view mirror display assembly of claim 1, wherein the novelty side view mirror display assembly is constructed and arranged to clamp against an edge of the side view mirror of a vehicle.

5. The novelty side view mirror display assembly of claim 1, wherein the at least one indicia member is a jewel.

6. The novelty side view mirror display assembly of claim 1, wherein the at least one indicia member includes an LED that illuminates during vehicle motion.

7. The novelty side view mirror display assembly of claim 4, wherein the first clamp surface and the second clamp surface are affixed with a scratch layer provided for contacting the side view mirror thereby preventing the first and second clamp surfaces from scratching paint when in contact with the side view mirror.

8. The novelty side view mirror display assembly of claim 1, wherein the at least one tension member is at least one screw.

9. The novelty side view mirror display assembly of claim 8, wherein rotating the at least one tension member clockwise causes a distal tip to push against a rear surface of the second clamp surface thereby drawing the second clamp surface towards the first clamp surface.

\* \* \* \* \*